(12) United States Patent
Takagaki

(10) Patent No.: US 9,584,627 B2
(45) Date of Patent: Feb. 28, 2017

(54) CONTROL DEVICE, CONTROL SYSTEM, AND CONTROL METHOD

(75) Inventor: Keiichi Takagaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 510 days.

(21) Appl. No.: 14/131,673

(22) PCT Filed: Jul. 3, 2012

(86) PCT No.: PCT/JP2012/004300
§ 371 (c)(1),
(2), (4) Date: Jan. 8, 2014

(87) PCT Pub. No.: WO2013/008411
PCT Pub. Date: Jan. 17, 2013

(65) Prior Publication Data

US 2014/0149497 A1    May 29, 2014

(30) Foreign Application Priority Data

Jul. 13, 2011  (JP) ................. 2011-154538

(51) Int. Cl.
*G06F 15/16* (2006.01)
*H04L 29/06* (2006.01)
(Continued)

(52) U.S. Cl.
CPC .............. *H04L 67/42* (2013.01); *H04L 67/28* (2013.01); *H04N 21/4122* (2013.01);
(Continued)

(58) Field of Classification Search
CPC ......... H04N 21/4122; H04N 21/41407; H04N 21/4325; H04N 21/43615; H04N 21/47217
See application file for complete search history.

(56) References Cited

U.S. PATENT DOCUMENTS 5,996,015 A * 11/1999 Day .................. H04L 29/06
                                                 348/E7.071
8,132,217 B2    3/2012  Miyata
(Continued)

FOREIGN PATENT DOCUMENTS

JP     2006-332771 A    12/2006
JP     2009-049498 A     3/2009
(Continued)

OTHER PUBLICATIONS

International Search Report issued in International Application No. PCT/JP2012/004300 with Date of mailing Jul. 31, 2012.

*Primary Examiner* — Aaron Strange
*Assistant Examiner* — Brandon L Sykes
(74) *Attorney, Agent, or Firm* — McDermott Will & Emery LLP

(57) ABSTRACT

A control device including: an input unit which accepts input of a reproduction mode; a content reproduction device determination unit which determines whether content is to be reproduced by a content reproduction device or by the control device, in accordance with the reproduction mode; and a display unit which displays reproduced content, wherein the content reproduction device determination unit transmits a content reproduction instruction to the content reproduction device if the content reproduction device determination unit determines that the content is to be reproduced by the content reproduction device, and the content reproduction device determination unit causes the display unit to display the content acquired from a server if the content reproduction device determination unit determines that the content is to be reproduced by the control device.

10 Claims, 6 Drawing Sheets

(51) Int. Cl.
*H04L 29/08* (2006.01)
*H04N 21/41* (2011.01)
*H04N 21/414* (2011.01)
*H04N 21/436* (2011.01)
*H04N 21/432* (2011.01)
*H04N 21/472* (2011.01)

(52) U.S. Cl.
CPC ... *H04N 21/41407* (2013.01); *H04N 21/4325* (2013.01); *H04N 21/43615* (2013.01); *H04N 21/47217* (2013.01)

(56) References Cited

U.S. PATENT DOCUMENTS

| | | | |
|---|---|---|---|
| 8,215,545 | B2 | 7/2012 | Otsu et al. |
| 2005/0229223 | A1 | 10/2005 | Katagishi et al. |
| 2006/0236232 | A1 | 10/2006 | Yuasa et al. |
| 2006/0262221 | A1 | 11/2006 | Yuasa et al. |
| 2006/0265083 | A1 | 11/2006 | Otsu et al. |
| 2007/0061725 | A1* | 3/2007 | Isaac .................. H04N 7/17318 715/717 |
| 2007/0143807 | A1* | 6/2007 | Suneya .............. H04N 21/2187 725/115 |
| 2008/0034029 | A1* | 2/2008 | Fang ..................... H04L 12/282 709/203 |
| 2008/0037952 | A1* | 2/2008 | Nallur ................. G11B 27/105 386/344 |
| 2008/0151702 | A1 | 6/2008 | Yuasa et al. |
| 2008/0175190 | A1* | 7/2008 | Lee ........................ G06F 21/10 370/328 |
| 2009/0138921 | A1 | 5/2009 | Miyata |
| 2010/0146084 | A1* | 6/2010 | Krikorian .......... H04N 5/44543 709/219 |
| 2011/0080948 | A1* | 4/2011 | Chen .................... H04N 19/597 375/240.12 |
| 2011/0113123 | A1* | 5/2011 | Takagaki ............. G11B 27/105 709/219 |
| 2011/0320626 | A1* | 12/2011 | Wong ............... H04N 21/41407 709/231 |
| 2012/0168501 | A1 | 7/2012 | Otsu et al. |
| 2012/0308193 | A1* | 12/2012 | Takayama .............. H04N 5/783 386/230 |

FOREIGN PATENT DOCUMENTS

| | | |
|---|---|---|
| JP | 2009-129194 A | 6/2009 |
| JP | 2009-253889 A | 10/2009 |

\* cited by examiner

CONTROL DEVICE, CONTROL SYSTEM, AND CONTROL METHOD

RELATED APPLICATIONS

This application is the U.S. National Phase under 35 U.S.C. §371 of International Application No. PCT/JP2012/004300, filed on Jul. 3, 2012, which in turn claims the benefit of Japanese Application No. 2011-154538, filed on Jul. 13, 2011, the disclosures of which Applications are incorporated by reference herein.

TECHNICAL FIELD

The present invention relates to control devices, control systems, and control methods, and, more particularly, to a control device, a control system, and a control method which instruct a content reproduction device on a network to reproduce a content and cause the content reproduction device to reproduce the content.

BACKGROUND ART

An industrial association known as the digital living network alliance (DLNA) is promoting standardization activities for interconnecting electrical household appliances and personal computers from different manufacturers. According to a DLNA guideline defined by the DLNA, a function is provided in which a digital media player (DMP) acquires content data from a digital media server (DMS) connected thereto via a network, and allows for remote viewing of the content data. Further in the DLNA guideline, in accordance with instructions from a digital media controller (DMC), a digital media renderer (DMR) can also acquire content data from the digital media server (DMS) and allow for remote viewing of the content data. In the following description, the digital media renderer (DMR), the digital media server (DMS), and the digital media controller (DMC) are simply referred to as a content reproduction device, a server, and a control device, respectively.

CITATION LIST

Patent Literature

[PTL 1] Japanese Unexamined Patent Application Publication No. 2006-332771

SUMMARY OF INVENTION

Technical Problem

In a system where a content reproduction device acquires content data from a server device and allows for remote viewing of the content in accordance with content reproduction instructions from a control device, a problem may occur, for example, that if a user desires to return to a normal-reproduction mode from a state where content is reproduced in a trick-reproduction mode such as fast-forwarding or rewinding, the user needs to operate a control device which switches reproduction modes, while checking display units (displays) of both the control device and the content reproduction device on which a video is being displayed.

In general, a system which requires a user to perform operations while the user checking a plurality of display devices is a user-unfriendly system where, for example, changing viewpoint is troublesome for the user and possibility of incorrect operations or untimely operations increases.

The present invention is made in view of the above problems, and has an object to provide a maneuverable control device, control system, and control method.

Solution to Problem

A control device according to one aspect of the present invention is controls reproduction of content stored in a server. Specifically, the control device includes: a communication unit configured to communicate with the server and a content reproduction device; an input unit configured to accept input of a reproduction mode specifying at least one of a reproduction speed, a reproduction direction, and a reproduction position of the content; a content reproduction device determination unit configured to determine, in accordance with the reproduction mode accepted by the input unit, whether the content is to be reproduced by the content reproduction device or by the control device; and a display unit configured to display the content reproduced by the control device. If the content reproduction device determination unit determines that the content is to be reproduced by the content reproduction device, the content reproduction device determination unit transmits a content reproduction instruction to the content reproduction device through the communication unit, the content reproduction instruction instructing the content reproduction device to reproduce the content in the reproduction mode accepted by the input unit, and if the content reproduction device determination unit determines that the content is to be reproduced by the control device, the content reproduction device determination unit acquires the content from the server through the communication unit and cause the display unit to display the content reproduced in the reproduction mode accepted by the input unit.

It should be noted that embodiments described below are each merely an illustration of the present invention. Values, shapes, materials, components, disposition or a form of connection between the components, steps, and the order of the steps are merely illustrative, and are not intended to limit the present invention. Moreover, among components of the below non-limiting embodiments, components not set forth in the independent claims indicating the top level concept of the present invention will be described as optional components.

Advantageous Effects of Invention

According to the present invention, whether content is to be reproduced by only the content reproduction device, only the control device, or both the content reproduction device and the control device can be adaptively switched in accordance with a reproduction mode. Thus, a maneuverable control device can be obtained.

DESCRIPTION OF EMBODIMENTS

Figure 1:
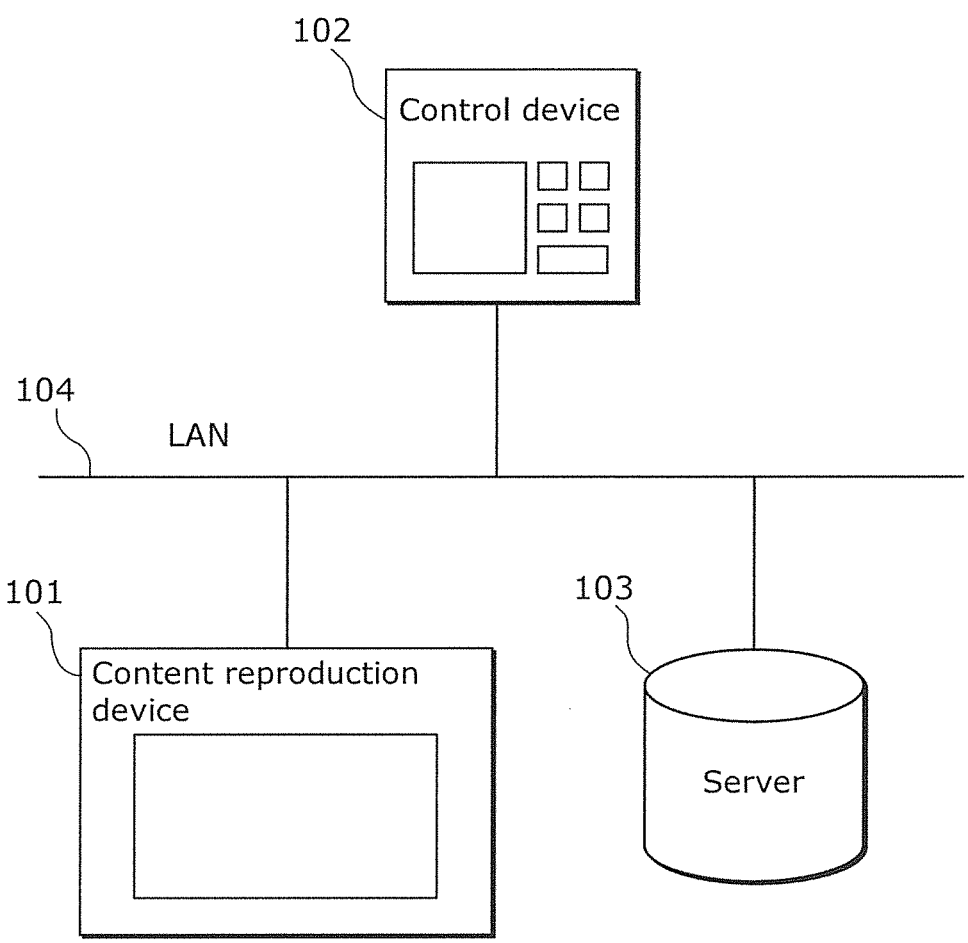
FIG. 1 is a diagram showing a configuration of a control system according to an embodiment 1.

Underlying Knowledge Forming Basis of the Present Invention

A method which solves the above-described problems is considered to display a video, displayed on the content reproduction device, also on the display unit (display) of the control device. For example, Patent Literature (PTL) 1 discloses a method which allows a user to readily check what content the control device causes the content reproduction device to reproduce, by displaying a video, displayed on the content reproduction device, also on the display unit (display) of the control device.

However, PTL 1, which is conventional, is intended to "use the display unit (display) of the control device to check what content is being reproduced by the content reproduction device." Therefore, description is given that an image displayed on the display unit (display) of the control device is updated every predetermined time period ranging from about 30 seconds to about 10 minutes. In other words, PTL 1 is not intended to "update a video on the display unit (display) of the control device at a frequency that can properly control a timing at which a reproduction mode returns to a normal-reproduction mode from a state where content is reproduced in a trick-reproduction mode such as fast-forwarding or rewinding."

Moreover, suppose application of the method disclosed in PTL 1 in a way sufficiently shortening the predetermined time period, a sever device is continuously accessed by two devices. Thus, the following problems may further occur.

First, as a first problem, if a sever limits the number of simultaneous accesses to content (the number of simultaneous sendouts), either the control device or the content reproduction device may not be able to reproduce the content.

Next, as a second problem, if the server has insufficient performance and attempts to send out a plurality of items of content simultaneously, a bitrate at which the server sends out the plurality of items of content falls below a bitrate necessary for reproducing the plurality of items of content. Thus, the plurality of items of content may not be reproduced smoothly.

Furthermore, as a third problem, if the reproduction speed for fast-forwarding, rewinding, or the like is different between the content reproduction device and the control device, a reproduction position of the content may not synchronize between the content reproduction device and the control device.

To solve the above problems, a control device according to one aspect of the present invention is controls reproduction of content stored in a server. Specifically, the control device includes: a communication unit configured to communicate with the server and a content reproduction device; an input unit configured to accept input of a reproduction mode specifying at least one of a reproduction speed, a reproduction direction, and a reproduction position of the content; a content reproduction device determination unit configured to determine, in accordance with the reproduction mode accepted by the input unit, whether the content is to be reproduced by the content reproduction device or by the control device; and a display unit configured to display the content reproduced by the control device. If the content reproduction device determination unit determines that the content is to be reproduced by the content reproduction device, the content reproduction device determination unit transmits a content reproduction instruction to the content reproduction device through the communication unit, the content reproduction instruction instructing the content reproduction device to reproduce the content in the reproduction mode accepted by the input unit, and if the content reproduction device determination unit determines that the content is to be reproduced by the control device, the content reproduction device determination unit acquires the content from the server through the communication unit and cause the display unit to display the content reproduced in the reproduction mode accepted by the input unit.

According to the above configuration, whether content is to be reproduced by only the content reproduction device, only the control device, and both the content reproduction device and the control device can be adaptively switched in accordance with a reproduction mode. As a result, a more maneuverable control device can be obtained.

As an example, if the reproduction mode is a normal-reproduction mode in which the content is reproduced forward at a predetermined reproduction speed, the content reproduction device determination unit may determine that the content is to be reproduced by only the content reproduction device, and if the reproduction mode is a trick-reproduction mode different from the normal-reproduction mode, the content reproduction device determination unit may determine that the content is to be reproduced by only the control device.

As another example, if the reproduction mode is a normal-reproduction mode in which the content is reproduced forward at a predetermined reproduction speed, the content reproduction device determination unit may determine that the content is to be reproduced by only the content reproduction device, and if the reproduction mode is a trick-reproduction mode different from the normal-reproduction mode, the content reproduction device determination unit may determine that the content is to be reproduced by both the content reproduction device and the control device.

As still another example, if the reproduction mode is a normal-reproduction mode in which the content is reproduced forward at a predetermined reproduction speed, the content reproduction device determination unit may determine that the content is to be reproduced by both the content reproduction device and the control device, and if the reproduction mode is a trick-reproduction mode different from the normal-reproduction mode, the content reproduction device determination unit may determine that the content is to be reproduced by only the control device.

Furthermore, the control device may further include a video synchronization control unit configured to synchronize reproduction of the content by the control device with reproduction of the content by the content reproduction device when the content is reproduced by both the content reproduction device and the control device.

Moreover, the video synchronization control unit may acquire a reproduction position of the content being reproduced by the content reproduction device, from the content reproduction device through the communication unit, and adjust an acquisition position of the content which is reproduced by the control device, or a timing at which the content is displayed on the display unit, in accordance with the reproduction position acquired through the communication unit.

Furthermore, the control device may further include a simultaneous content reproduction ability determination unit configured to determine whether the server is capable of simultaneously sending out a plurality of items of the content. If the simultaneous content reproduction ability determination unit determines that the server is capable of simultaneously sending out the plurality of items of content, the content reproduction device determination unit may further determine that the content is to be reproduced by both the content reproduction device and the control device.

Furthermore, the control device may further include a simultaneous content reproduction ability determination unit configured to determine whether the control device is capable of receiving a plurality of items of the content at a bitrate necessary for reproducing the plurality of items of content in the reproduction mode accepted by the input unit. If the simultaneous content reproduction ability determination unit determines that the control device is capable of receiving the plurality of items of content at the bitrate necessary for reproducing the plurality of items of content in the reproduction mode accepted by the input unit, the content reproduction device determination unit may further determine that the content is to be reproduced by both the content reproduction device and the control device.

Moreover, if the content reproduction device determination unit determines that the content is to be reproduced by both the content reproduction device and the control device, the content reproduction device determination unit may further transmit the content acquired from the server through the communication unit to the content reproduction device through the communication unit.

As still another example, if the reproduction mode is a normal-reproduction mode in which the content is reproduced forward at a predetermined reproduction speed, the content reproduction device determination unit may determine that the content is to be reproduced by only the content reproduction device, and if the reproduction mode is seek operation in which a reproduction position of the content is designated, the content reproduction device determination unit may determine that the content is to be reproduced by at least the control device.

Furthermore, the input unit may further accept input of correspondence between the reproduction mode and whether the content is to be reproduced by the content reproduction device or by the control device when the reproduction mode is selected. The content reproduction device determination unit may determine whether the content is to be reproduced by the content reproduction device or by the control device, in accordance with the correspondence accepted by the input unit.

Furthermore, the display unit may further display a list of content stored in the server. The input unit may further accept selection of content to be reproduced from the list of content displayed on the display unit.

Moreover, the communication unit may communicate with the server and the content reproduction device, using a communication protocol conforming to a digital living network alliance (DLNA) standard.

A control system according to one aspect of the present invention includes a server storing content, a content reproduction device for reproducing the content, and a control device for controlling the reproduction of the content. The control device includes: a first communication unit configured to communicate with the server and the content reproduction device; an input unit configured to accept input of a reproduction mode specifying at least one of a reproduction speed, a reproduction direction, and a reproduction position of the content; a content reproduction device determination unit configured to determine, in accordance with the reproduction mode accepted by the input unit, whether the content is to be reproduced by the content reproduction device or by the control device; and a first display unit configured to display the content reproduced by the control device. If the content reproduction device determination unit determines that the content is to be reproduced by the content reproduction device, the content reproduction device determination unit is configured to transmit a content reproduction instruction to the content reproduction device through the first communication unit, the content reproduction instruction instructing the content reproduction device to reproduce the content in the reproduction mode accepted by the input unit, and if the content reproduction device determination unit determines that the content is to be reproduced by the control device, the content reproduction device determination unit is configured to acquire the content from the server through the first communication unit and cause the first display unit to display the content reproduced in the reproduction mode accepted by the input unit. The content reproduction device including: a second communication unit configured to communicate with the control device and the server; and a second display unit configured to display the content reproduced in the reproduction mode, if the second display unit receives the content reproduction instruction from the control device through the second communication unit.

A control method according to one aspect of the present invention is a method executed by a control device for controlling reproduction of content stored in a server. Specifically, the control method includes: (a) accepting input of a reproduction mode specifying at least one of a reproduction speed, a reproduction direction, and a reproduction position of the content; (b) determining, in accordance with the reproduction mode accepted in step (a), whether the content is to be reproduced by a content reproduction device or by the control device; (c) transmitting a content reproduction instruction to the content reproduction device, the content reproduction instruction instructing the content reproduction device to reproduce the content in the reproduction mode accepted in step (a), if it is determined in step (b) that the content is to be reproduced by the content reproduction device; and (d) acquiring the content from the server and reproducing the acquired content in the reproduction mode accepted in step (a) if it is determined in step (b) that the content is to be reproduced by the control device.

These general and specific aspects may be implemented using a system, a method, an integrated circuit, a computer program, or a computer-readable recording medium, or any combination of systems, methods, integrated circuits, computer programs, or computer-readable recording media.

Embodiments according to the present invention will be described, with reference to the accompanying drawings. It should be noted that components referred to by same reference signs perform the same operations in the embodiments, and thus the description may not be repeated. Embodiments described below are each merely an illustration of the present invention. Values, shapes, materials, components, disposition or a form of connection between the components, steps, and the order of the steps are merely illustrative and not intended to limit the present invention. Moreover, among components of the below embodiments, components not set forth in the independent claims indicating the top level concept of the present invention will be described as optional components.

Embodiment 1

In an embodiment 1 according to the present invention, a configuration of a control system of FIG. 1 will be described by way of example. The control system in FIG. 1 includes a control device 102, a content reproduction device 101, and a server 103. The control device 102, the content reproduction device 101, and the server 103 are connected to a LAN 104 and are communicable with one another.

Figure 2:
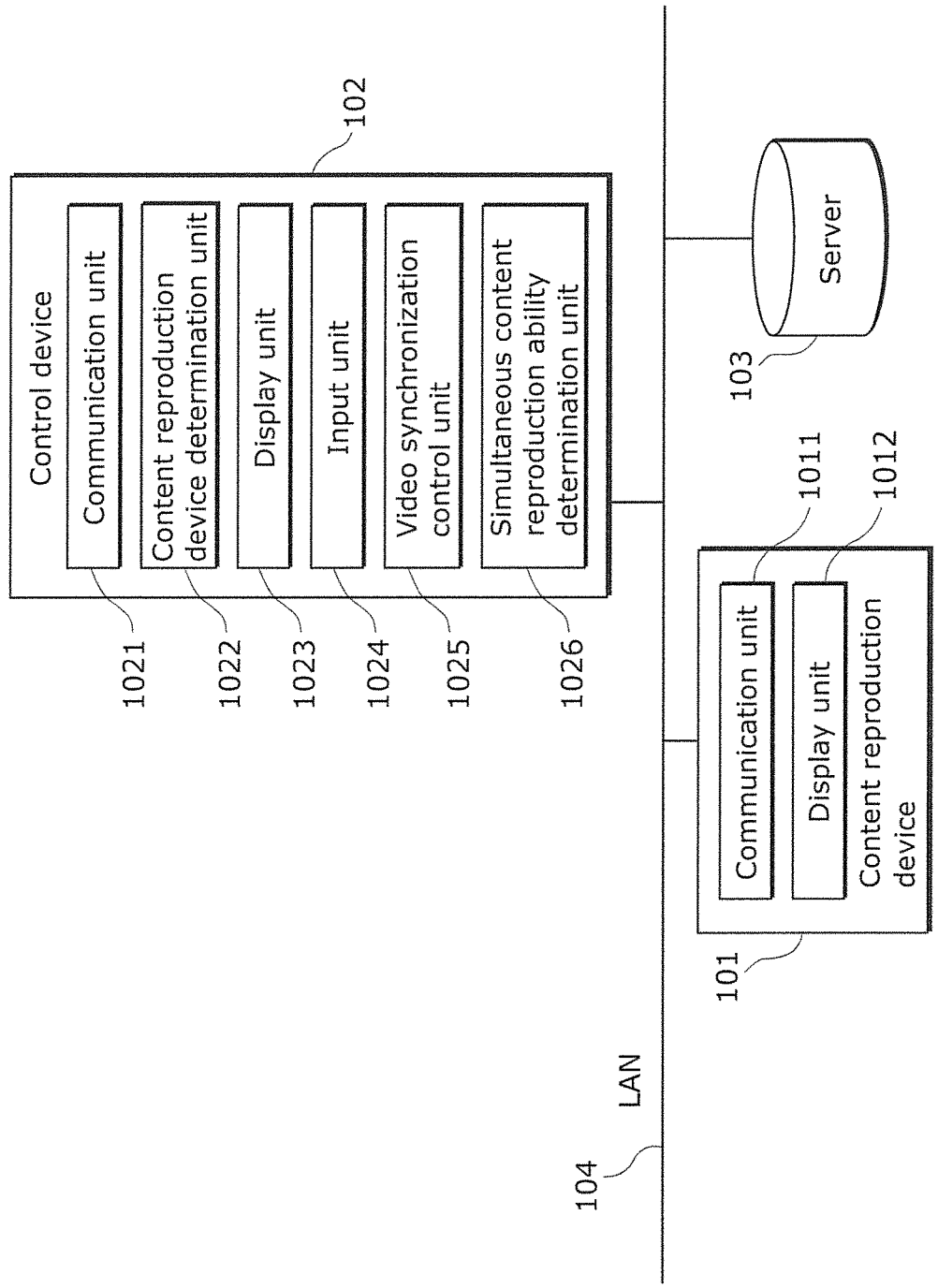
FIG. 2 is a diagram showing detailed configuration of the control system according to the embodiment 1.

FIG. 2 is a diagram showing detailed configuration of the control system according to the embodiment 1 of the present invention. The control device 102 includes, as shown in FIG. 2, a communication unit 1021, a content reproduction device determination unit 1022, a display unit 1023, an input unit 1024, a video synchronization control unit 1025, and a simultaneous content reproduction ability determination unit 1026. It should be noted that the video synchronization control unit 1025 and the simultaneous content reproduction ability determination unit 1026 are not essential to the control device 102 and can be omitted.

The communication unit 1021 is a communication interface which performs communications with the content reproduction device 101 and the server 103 via the LAN 104. While communication protocols supported by the communication unit 1021 are not particularly limited, communication protocols conforming to, for example, digital living network alliance (DLNA) standard may be used.

The content reproduction device determination unit 1022 determines whether content which is viewed by a user is to be reproduced by the content reproduction device 101 and determines whether the content is to be reproduced by the control device 102, in accordance with a reproduction mode described below. More specifically, the content reproduction device determination unit 1022 determines whether content is to be reproduced by only the content reproduction device 101, only the control device 102 or both the content reproduction device 101 and the control device 102.

As an example, the content reproduction device determination unit 1022 may determine that the content is to be reproduced by only the content reproduction device 101 if the reproduction mode is a normal-reproduction mode, and determine that the content is to be reproduced by only the control device 102 if the reproduction mode is a trick-reproduction mode.

As another example, the content reproduction device determination unit 1022 may determine that the content is to be reproduced by only the content reproduction device 101 if the reproduction mode is the normal-reproduction mode, and determine that the content is to be reproduced by both the content reproduction device 101 and the control device 102 if the reproduction mode is the trick-reproduction mode.

As still another example, the content reproduction device determination unit 1022 may determine that the content is to be reproduced by both the content reproduction device 101 and the control device 102 if the reproduction mode is the normal-reproduction mode, and determine that the content is to be reproduced by only the control device 102 if the reproduction mode is the trick-reproduction mode.

As still another example, the content reproduction device determination unit 1022 may determine that the content is to be reproduced by only the content reproduction device 101 if the reproduction mode is the normal-reproduction mode, and determine that the content is to be reproduced by at least the control device 102 if the reproduction mode is seek operation.

When the content reproduction device determination unit 1022 determines that the content is to be reproduced by the content reproduction device 101, the content reproduction device determination unit 1022 transmits reproduction instructions instructing the content reproduction device 101 to reproduce the content in a designated reproduction mode to the content reproduction device 101 through the communication unit 1021. When the content reproduction device determination unit 1022 determines that the content is to be reproduced by the control device 102, the content reproduction device determination unit 1022 acquires the content from the server 103 through the communication unit 1021, and causes the display unit 1023 to display the content which is reproduced in a reproduction mode received by the input unit 1024. Furthermore, if the content reproduction device determination unit 1022 determines that the content is to be reproduced by both the content reproduction device 101 and the control device 102, the content reproduction device determination unit 1022 performs both of the two processes described above.

The reproduction mode is information specifying at least one of a reproduction speed, a reproduction direction (forward reproduction, reverse reproduction), and a reproduction position of content. The reproduction mode is broadly divided into, for example, a normal-reproduction mode, in which content is reproduced forward at a predetermined reproduction speed (a first reproduction speed), and a trick-reproduction mode. The trick-reproduction mode includes fast-forwarding where content is reproduced forward at, for example, a second reproduction speed faster than the first reproduction speed, rewinding where content is reproduced in reverse, and seek operation where a reproduction position of content is designated. However, the reproduction mode is not limited thereto.

The display unit 1023 is a display on which content is reproduced (displayed). While the specific configuration of the display unit 1023 is not particularly limited, a liquid crystal display, plasma display panel, or organic electroluminescence (EL) display can be employed, for example.

The input unit 1024 is an interface which accepts input of various pieces of information from a user. While the specific configuration of the input unit 1024 is not particularly limited, any input device such as a touch panel, a keyboard (pushbuttons), and a mouse can be employed, for example. The information accepted by the input unit 1024 includes a reproduction mode, content to be reproduced, and correspondence between the reproduction mode and a content reproduction device. The details will be described below.

When content is reproduced by both the content reproduction device 101 and the control device 102, the video synchronization control unit 1025 synchronizes the content which is reproduced by the control device 102 with the content which is reproduced by the content reproduction device 101. Specifically, the video synchronization control unit 1025 acquires a reproduction position of the content being reproduced by the content reproduction device 101, from the content reproduction device 101 through the communication unit 1021. The video synchronization control unit 1025 then synchronizes content reproduction by the control device 102 with the reproduction position acquired through the communication unit 1021.

As an example, the video synchronization control unit 1025 may request the server 103 to transmit data, of content to be reproduced, which corresponds to the acquired reproduction position (adjustment of an acquisition position of the content). As another example, the video synchronization control unit 1025 may acquire content from the server 103 as normal, and adjust a timing at which the acquired content is read from a buffer (not shown) and displayed on the display unit 1023, in accordance with the acquired reproduction position (adjustment of the display timing).

The simultaneous content reproduction ability determination unit 1026 determines whether content can be simultaneously reproduced by both the content reproduction device 101 and the control device 102. Then, the content reproduction device determination unit 1022 determines, based on a result of the determination by the simultaneous content reproduction ability determination unit 1026, whether content is to be reproduced by both the content reproduction device 101 and the control device 102 or by either one of them.

As an example, the simultaneous content reproduction ability determination unit 1026 may determine, based on information acquired from the server 103, whether the server 103 has capability of simultaneously sending out a plurality of items of the content. As another example, the simultaneous content reproduction ability determination unit 1026 may actually download the plurality of items of content and determine whether the control device 102 can receive the plurality of items of content at a bitrate necessary for reproducing the plurality of items of content in a designated reproduction mode.

The content reproduction device 101 includes a communication unit 1011 and a display unit 1012 as shown in FIG. 2. The content reproduction device 101 reproduces content in a reproduction mode indicated by content reproduction instructions if the content reproduction device 101 receives the content reproduction instructions from the control device 102.

The communication unit 1011 is a communication interface which performs communications with the control device 102 and the server 103 via the LAN 104. While communication protocols supported by the communication unit 1011 are not particularly limited, communication protocols conforming to, for example, digital living network alliance (DLNA) standard may be used.

The display unit 1012 is a display on which content is reproduced (displayed). While the specific configuration of the display unit 1012 is not particularly limited, a liquid crystal display, plasma display panel, or organic electroluminescence (EL) display can be employed, for example.

Specific examples of the control device 102 are contemplated, such as a smartphone, a tablet, a remote controller, a mobile terminal such as a note PC, or a desktop personal computer (PC). Specific examples of the content reproduction device 101 are contemplated, such as a television set, a desktop PC, or a tablet.

In the following, operation of the control device 102 according to the present embodiment will be described, with reference to a flowchart illustrated in FIG. 3.

First, a user performs operation of acquiring a list of content via the input unit 1024 of the control device 102, to select content to be reproduced (step S301). This causes the control device 102 to transmit a get content list request to the server 103 through the communication unit 1021 (step S302).

When the server 103 receives the get content list request from the control device 102, the server 103 responds to the control device 102 the list information of content to be distributed by the server 103 (step S303). Then, if the control device 102 receives the list information of content from the server 103 through the communication unit 1021, the control device 102 displays the list of content stored in the server 103 on the display unit 1023 (step S304).

Next, the user performs operation of selecting content desired by the user to reproduce from the list of content displayed on the display unit 1023, via the input unit 1024 of the control device 102 (step S305). It should be noted that selection of content refers to such operation as focusing on content desired by the user to reproduce, assuming a state in which reproduction (input of reproduction mode) is not actually started yet.

It should be noted that in the control device 102 which includes the display unit 1023 having a touch panel mounted thereon, two operations, selection of content and input of a reproduction mode described next, may be collectively performed by one operation of touching a portion, on the touch panel, where the content desired by the user to reproduce is displayed. However, for ease of description, the selection of content and the input of a reproduction mode are described, herein, as different operations.

The control device 102 is in a wait state for input of a reproduction mode while content is being selected (step S307). In this state, the user inputs a reproduction mode for starting reproduction of the content, via the input unit 1024 (step S306).

It should be noted that in many cases, a user can select only the normal-reproduction mode in the beginning (a state where reproduction of the selected content is not started yet), and after the start of the normal-reproduction mode, the user can perform operations of, for example, changing the reproduction mode to the trick-reproduction mode such as fast-forwarding or rewinding, or returning from the trick-reproduction mode to the normal-reproduction mode. A user can, of course, repeat the input of reproduction mode (step S306).

After a reproduction mode is input in the wait state for input of a reproduction mode (step S306), the content reproduction device determination unit 1022 changes processing, in accordance with the input reproduction mode (step S308). Specifically, if the reproduction mode is the normal-reproduction mode ("Normal-reproduction mode" in step S308), the content reproduction device determination unit 1022 transmits the content reproduction instructions to the content reproduction device 101 through the communication unit 1021 (executes content reproduction request in step S309). The content reproduction instructions includes, for example, information (a content ID) identifying content to be reproduced, a source from which the content is acquired (the server 103 in the embodiment 1), and information specifying the reproduction mode input in step S306.

The content reproduction device 101, which has received the content reproduction instructions from the control device 102, transmits a get content request to the server 103 through the communication unit 1011 (step S310), receives content transmitted from the server 103, and reproduces the content in the reproduction mode indicated by the content reproduction instructions (step S311). It should be noted that in the example of FIG. 3, the content is not reproduced by the control device 102 if the reproduction mode is the normal-reproduction mode, to prevent load on the server 103 from increasing.

Next, processing if the reproduction mode is the trick-reproduction mode such as fast-forwarding or rewinding will be described. The processing corresponds to a process A which is performed if the reproduction mode is the trick-reproduction mode in step S308 of FIG. 3, and will be described in the following, with reference to a flowchart illustrated in FIG. 4.

If the reproduction mode is the trick-reproduction mode ("Trick-reproduction mode" in step S308 of FIG. 3), the control device 102 reproduces the content using at least the display unit 1023 of the own device. Specifically, the control device 102 transmits the get content request to the server 103 through the communication unit 1021 (step S401), receives content transmitted from the server 103, and reproduces the content in the reproduction mode accepted by the input unit 1024 (step S402).

A user who performs reproduction in the trick-reproduction mode (such as fast-forwarding or rewinding), in many cases, switches the reproduction mode to the normal-reproduction mode at a moment when a desired reproduction position arrives. Hence, according to the control device 102 having the above configuration, by using the input unit 1024 of the control device 102 a user can switch the trick-reproduction mode to the normal-reproduction mode, while seeing content being reproduced in the trick-reproduction mode on the display unit 1023 of the control device 102. Thus, the user can readily return the reproduction mode to the normal-reproduction mode at a desired timing, without changing viewpoint.

Advantageous effects of the present invention can be expected just with the above processing. It is, however, desirable that content is reproduced not only by the control device 102 but also simultaneously by the control device 102 during the trick-reproduction mode. In other words, execution of the processing up to step S402 of FIG. 4 reproduces the content by only the content reproduction device 101 during the trick-reproduction mode. The processing of step S403 and the following is then performed so that the content is reproduced also by the content reproduction device 101, thereby further enhancing user convenience.

Specifically, advantageous effects can be expected that content (video) in the trick-reproduction mode (such as fast-forwarding) can be checked in a high-resolution manner on a large screen (the display unit 1012) mounted on the content reproduction device 101, and a user other than the user who is operating the control device 102 can also check the current reproduction position on the content reproduction device 101.

However, if attempt is made to reproduce content using the content reproduction device 101, in addition to the control device 102, the first problem, the second problem, and the third problem described above may occur. Hence, description together with a method for solving these problems will be given in the following.

First, to check if the first problem may occur where the content may not be reproduced by either the control device 102 or the content reproduction device 101 if the server 103 limits the number of simultaneous accesses to the content, the simultaneous content reproduction ability determination unit 1026 transmits the second content reproduction request to the server 103 through the communication unit 1021 while the content is being reproduced by the control device 102 (step S402) (step S403).

In step S403, the content reproduction request for the same content as that received in step S402 is transmitted. Hence, in the following description, the content received in step S402 will be denoted as first content, and content (which is the same as the first content) to be sent out from the server 103 in parallel with the first content will be denoted as second content.

The server 103 which has received the get content request sends out new content (the second content) in response to the content reproduction request to thereby check whether a given sendable number of content items is exceeded (step S404). While, herein, an example of checking based on the given sendable number of content items is described, the present invention is not limited thereto. For example, the server 103 may check if new content can be sent out, depending on the load on the server 103 at that time. If it is determined that the given sendable number of content items is exceeded ("Y" in step S404), the server 103 sends an error response to the control device 102 (step S405).

It should be noted that in the DLNA standard, a HTTP (Hyper Text Transfer Protocol) protocol or a RTSP (Real Time Streaming Protocol) protocol is used for content acquisition. Hence, the error response, herein, corresponds to responding an error code 503 (Service Unavailable) to the get content request by Get method in HTTP and the get content request by Play method in RTSP.

Next, the simultaneous content reproduction ability determination unit 1026 of the control device 102 checks whether the control device 102 has received the error response (step S406). When the control device 102 has received the error response ("Y" in step S406), the control device 102 ends the processing of FIG. 4 without providing the content reproduction instructions to the content reproduction device 101.

On the other hand, if the control device 102 does not receive the error response ("N" in step S406), the simultaneous content reproduction ability determination unit 1026 receives the second content from the server 103 through the communication unit 1021. In this state, the simultaneous content reproduction ability determination unit 1026 checks if the second problem has occurred where if the server 103 attempts to send out a plurality of items of the content simultaneously, the bitrate at which the server 103 sends out the plurality of items of content falls below the bitrate (threshold) necessary for reproducing the plurality of items of content, and the plurality of items of content may not be reproduced smoothly. While there are various factors which cause the bitrate to fall below the threshold, if the performance of the server 103 is insufficient for example, the bandwidth of the LAN 104 may be insufficient or the like.

Specifically, the simultaneous content reproduction ability determination unit 1026 measures a remaining amount in a primary buffer being used for the reproduction of the first content being executed (the amount of data of content stored in the primary buffer) in step S402 (step S407). The primary buffer is used to absorb fluctuation in data arrival, which occurs depending on conditions of a network (the LAN 104) or the server 103, so that content can be stably reproduced. In other words, more than a certain amount of data needs to be constantly buffered in the primary buffer. Hence, if the remaining amount in the primary buffer corresponds to given conditions, such as a tendency of decrease in remaining amount or the remaining amount is below a certain value, the simultaneous content reproduction ability determination unit 1026 may determine that the bitrate necessary for reproducing the plurality of items of content cannot be maintained.

Once the simultaneous content reproduction ability determination unit 1026 successfully acquires a measurement value of the remaining amount in the primary buffer, the simultaneous content reproduction ability determination unit 1026 stops acquisition of the second content acquired by the get content request in step S403 to stably continue the reproduction of the first content (reproduction in step S402)

by the control device 102 (step S408). This stops the server 103 from sending out the second content (step S409).

Next, the simultaneous content reproduction ability determination unit 1026 checks if the bitrate necessary for reproducing the second content can be maintained, from the obtained measurement value of the remaining amount in the primary buffer (step S410). Here, if it is determined that the bitrate necessary for reproducing the second content cannot be maintained ("N" in step S410), the control device 102 ends the processing of FIG. 4, without instructing the content reproduction device 101 to reproduce content.

On the other hand, if it is determined that the bitrate necessary for reproducing the second content can be maintained ("Y" in step S410), the control device 102 transmits the content reproduction instructions to the content reproduction device 101 through the communication unit 1021 (step S411). Then, the content reproduction device 101, which has received the content reproduction instructions through the communication unit 1011, transmits the get content request to the server 103 through the communication unit 1011 (step S412), and reproduces the second content transmitted from the server 103 through the communication unit 1011 (step S413).

Next, processing on the third problem where a reproduction position of content does not synchronize between the content reproduction device 101 and the control device 102 if the reproduction speed for fast-forwarding, rewinding, or the like is different between the content reproduction device 101 and the control device 102, will be described, with reference to a flowchart illustrated in FIG. 5.

Figure 4:
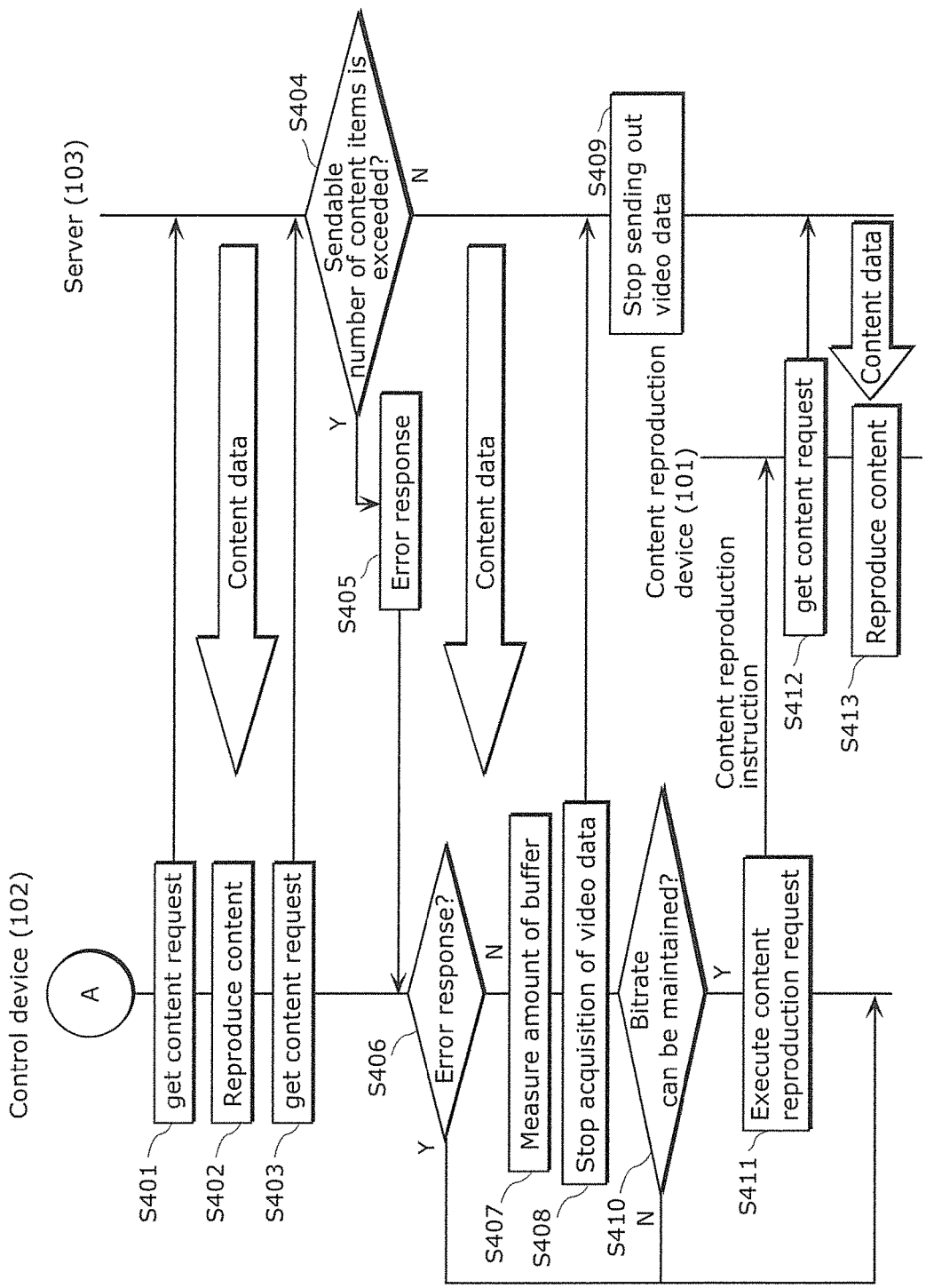
FIG. 4 is a flowchart illustrating processing of the control device where content is reproduced by both a content reproduction device and the control device according to the embodiment 1.
Figure 5:
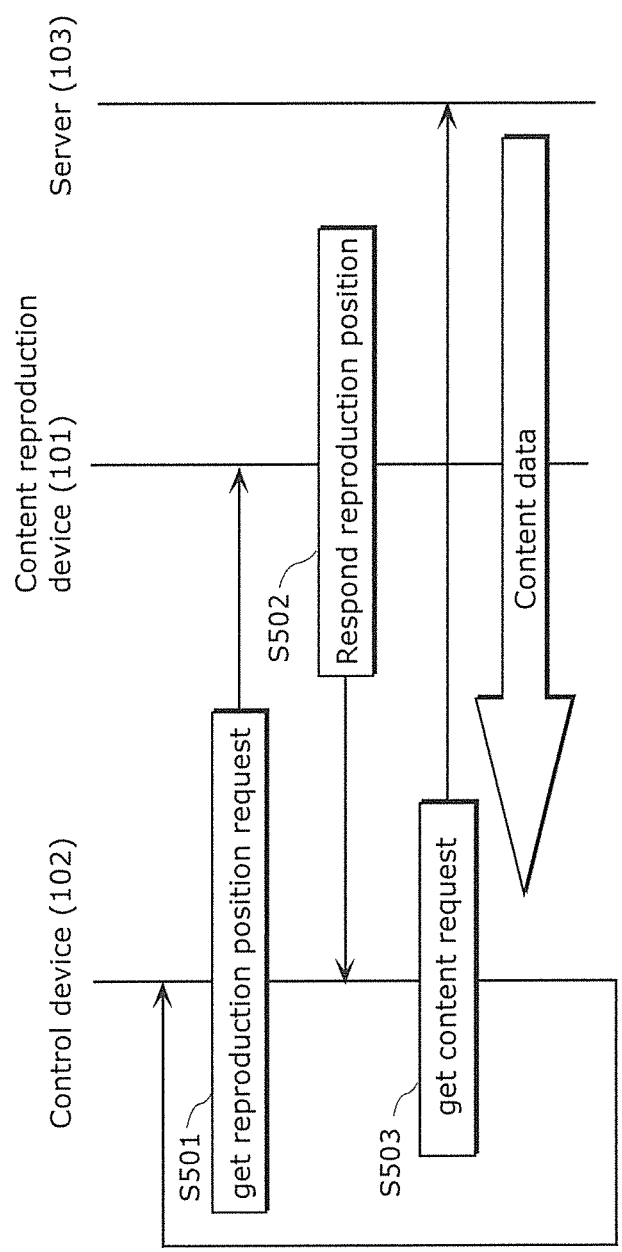
FIG. 5 is a flowchart illustrating processing of the control device according to the embodiment 1 for video synchronization control.

FIG. 5 is a flowchart illustrating processing of synchronizing a reproduction position of content (video) between the reproduction of the first content by the control device 102 which is started in step S402 of FIG. 4 and the reproduction of the second content by the content reproduction device 101 which is started in step S413 of FIG. 4.

Examples of a cause of asynchronous reproduction position of content between the content reproduction device 101 and the control device 102 include a timing for start of content reproduction being off due to delay in communicating a control command, a timing for start of content reproduction being off due to initial buffering time/size at each device, and content not necessarily being reproduced by devices at the same reproduction speed even if the same reproduction speed is designated, depending on a content reproduction control algorithm of each device.

First, the video synchronization control unit 1025 of the control device 102 transmits a get reproduction position request to the content reproduction device 101 through the communication unit 1021 (step S501). Since the content reproduction device 101 continues content reproduction while acquiring the second content from the server 103, after the content reproduction device 101 receives the get reproduction position request the content reproduction device 101 responds, through the communication unit 1011, a reproduction position of the second content (video) currently reproducing (step S502). The reproduction position, herein, is generally the beginning of content, or designated by the data size or a time at the reproduction position designated by a get content command.

It should be noted that the DLNA standards may use an AV transport (AVT) protocol defined by UPnP AV (Universal Plug and Play Audio Visual) standards for the transmission and reception of the content reproduction instructions or the content reproduction stop request between the digital media controller (DMC) and the digital media renderer (DMR). A command GetPositionInfo of AVT can be used to communicate the get reproduction position request and its response.

Next, the video synchronization control unit 1025 transmits the get content request to the server 103 through the communication unit 1021, based on the reproduction position, acquired in step S502, of the second content reproduced by the content reproduction device 101 (step S503). The get content request includes, for example, an identifier (a content ID) identifying content and information specifying a reproduction position of the content.

The server 103 which has received the get content request from the control device 102 transmits, to the control device 102, data of the first content corresponding to the reproduction position designated by the get content request. In other words, the server 103 transmits data of the first content subsequent to the reproduction position to the control device 102. The control device 102 then reproduces the data acquired from the server 103 (i.e., reproduces the first content from the reproduction position).

By performing the above processing (steps S501 to S503) at predetermined time intervals (for example, every 5 seconds), a video of the same content at the same reproduction position can be reproduced by the control device 102 and the content reproduction device 101. It should be noted that a delay of about hundreds of milliseconds to about 1 second may occur between when the response of reproduction position is received (step S502) and when the control device 102 actually reproduces the content. Thus, considering this, the control device 102 may adjust a position designated by the get content request (step S503) by an algorithm.

Examples of the predetermined algorithm include a method which adds a period of time and/or a constant data size to the responded reproduction position, and a method which adjusts a value to be added to the responded reproduction position, based on statistics previously measured. While, herein, the method has been described in which the control device 102 makes the get content request for each acquisition of reproduction position (step S503), the content acquisition may be independently performed and the control device 102 may adjust a timing at which the acquired data is reproduced.

Herein, the description has been given that the content is reproduced by only the content reproduction device 101 in the normal-reproduction mode, and the content is reproduced by at least the control device 102 in the trick-reproduction mode. However, the present invention is not limited thereto.

For example, content may be reproduced by both the content reproduction device 101 and the control device 102 in the normal-reproduction mode. In this case, the procedure on the first and second problems in the trick-reproduction mode described in FIG. 4 can be almost directly applied to content reproduction in the normal-reproduction mode as well. A difference between the trick-reproduction mode and the normal-reproduction mode is that content reproduction by the content reproduction device 101 is requisite in the normal-reproduction mode whereas content reproduction by the control device 102 is requisite in the trick-reproduction mode. In other words, the sequence is as illustrated in the flowchart of FIG. 4, but with the content reproduction by the control device 102 (steps S401 and S402) and the content reproduction by the content reproduction device 101 (steps S411, S412, and S413) interchanged.

Moreover, procedure similar to that for the trick-reproduction mode is also applicable to the procedure on the above-described third problem. A difference between the trick-reproduction mode and the normal-reproduction mode is that the get content request in the normal-reproduction mode is made once at the start of reproduction whereas the get content request can be made in the trick-reproduction mode for each acquisition of reproduction position (step S503). Thus, for synchronization of content (video), a method is used which adjusts a timing at which acquired content is reproduced.

Moreover, a user may be allowed to make setting arbitrary whether, in the normal-reproduction mode and the trick-reproduction mode, content is reproduced by only the content reproduction device 101, only the control device 102, or both the content reproduction device 101 and the control device 102. In other words, the control device 102 may accept from a user through the input unit 1024 correspondence between the reproduction mode and whether the content is to be reproduced by the content reproduction device or the control device when the reproduction mode is selected. The content reproduction device determination unit 1022 may then determine which device is to reproduce content, in accordance with the correspondence accepted through the input unit 1024. Moreover, a user may be allowed to make setting arbitrary whether the first to third problems described above are to be controlled.

As described above, according to the control device, the control system, and the control method of the present embodiment, if the reproduction mode is the normal reproduction that imposes load on the server 103 and requires reproduction of the content in a high-resolution manner, the content is reproduced by at least the content reproduction device 101 which can reproduce the content on a large screen or in a high-resolution manner, and if the reproduction mode is the trick reproduction such as fast-forwarding or rewinding that imposes load lightly on the server 103 and does not much require reproduction of the content on a large screen of in a high-resolution manner, the content is reproduced by at least the control device 102. Furthermore, reproduction of the content by both the content reproduction device 101 and the control device 102 is possible even if the reproduction mode is the trick reproduction, insofar as there is no limitation in the server 103 such as its performance or the number of simultaneous accesses.

Embodiment 2

Next, referring to FIG. 6, operation of a content reproduction device 101, a control device 102, and a server 103 according to an embodiment 2 will be described. It should be noted that similarities to the embodiment 1 will be omitted from description, and a difference of the embodiment 2 from the embodiment 1 will be described. First, the configuration of the content reproduction device 101 and the control device 102 is common to the embodiment 1 in FIG. 2, and thus the description will not be repeated.

In the embodiment 1 according to the present invention, the description has been given that both the control device 102 and the content reproduction device 101 acquire content from the server 103 to reproduce the content simultaneously on the control device 102 and the content reproduction device 101. In contrast, in the present embodiment 2, description will be given that only the control device 102 acquires and reproduces content that is from the server 103, and the content reproduction device 101 acquires and reproduces the content from the control device 102.

In other words, if a content reproduction device determination unit 1022 according to the embodiment 2 determines that content is to be reproduced by both the content reproduction device 101 and the control device 102, the content reproduction device determination unit 1022 transmits the content, acquired from the server 103 through a communication unit 1021, to the content reproduction device 101 through the communication unit 1021. This allows one piece of data to be sent out by the server 103. As a result, the control device 102 and the content reproduction device 101 can reproduce the content, without increasing load on the server 103 and without limitation in the server 103 such as its performance or the number of simultaneous accesses.

Figure 3:
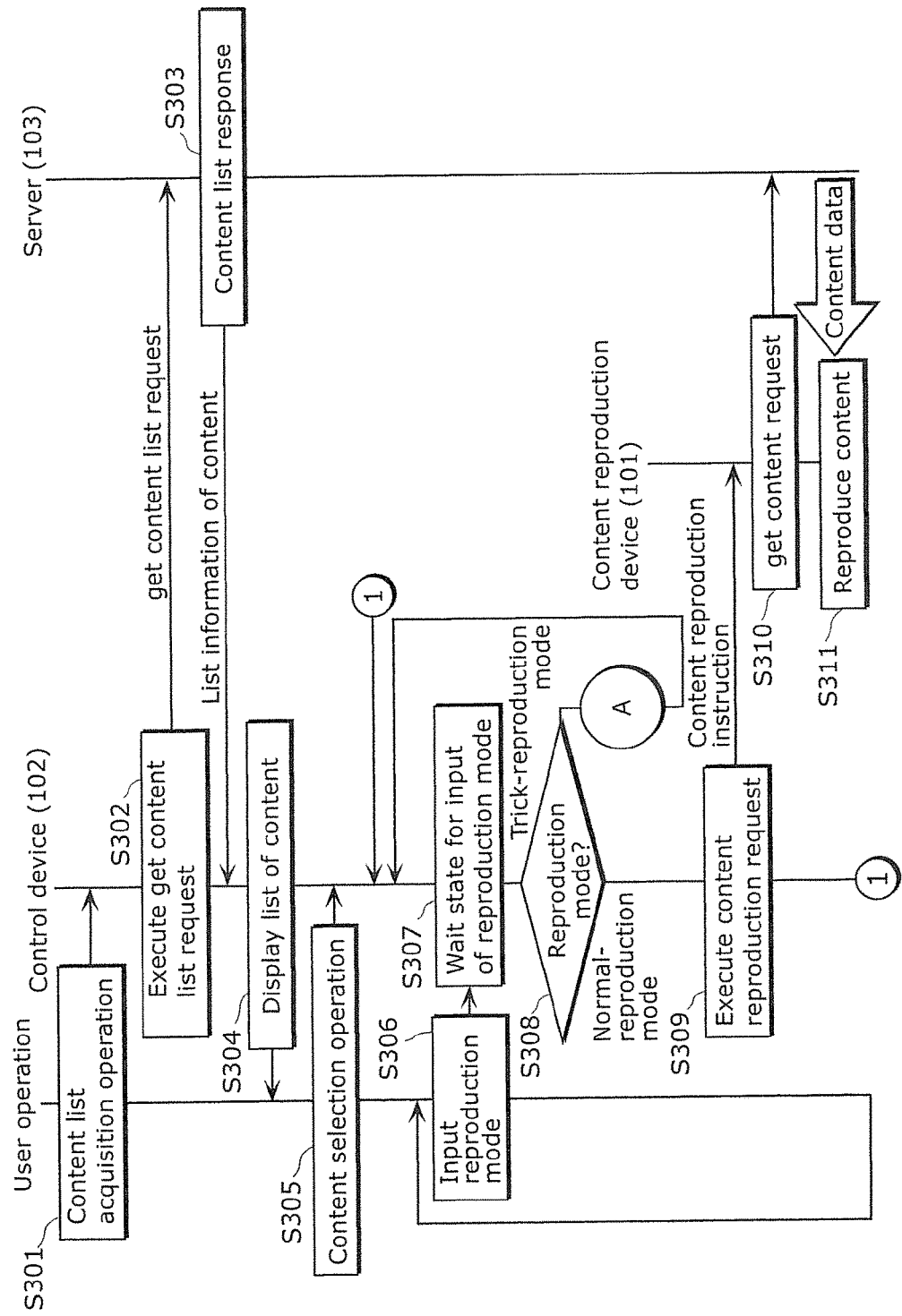
FIG. 3 is a flowchart illustrating processing of a control device according to the embodiment 1.

Processing from when a user selects content and inputs a reproduction mode through an input unit 1024 to when the content reproduction device determination unit 1022 determines the input reproduction mode (steps S301 to S308 of FIG. 3) is similar to the processing illustrated in FIG. 3. Thus, the description will not be repeated. Here, details of processing corresponding to the process A of FIG. 3 in the present embodiment 2 will be described, with reference to a flowchart illustrated in FIG. 6.

First, the control device 102 acquires content from the server 103 through the communication unit 1021, and reproduces the acquired content (steps S601 and S602). In addition, the control device 102 temporarily stores data of the content acquired here into a storage unit (not shown) to send out to the content reproduction device 101.

Next, the control device 102 sends out content reproduction instructions to the content reproduction device 101 through the communication unit 1021 (step S603). Here, the content reproduction instructions designate, as a source from which the content is to be acquired, the control device 102 rather than the server 103. Due to this, the content reproduction device 101, which has received the content reproduction instructions from the control device 102, transmits a get content request to the control device 102 (step S604). The control device 102 transmits the content data temporarily stored in the storage unit (not shown) to the content reproduction device 101. The content reproduction device 101 then reproduces the content received from the control device 102 (step S605).

Moreover, to synchronize the content (video) reproduced by the control device 102 with the content reproduced by the content reproduction device 101, the video synchronization control unit 1025 transmits a get reproduction position request to the content reproduction device 101 through the communication unit 1021 (step S606). In return, the content reproduction device 101 responds a reproduction position to the control device 102 through the communication unit 1011 (step S607).

Figure 6:
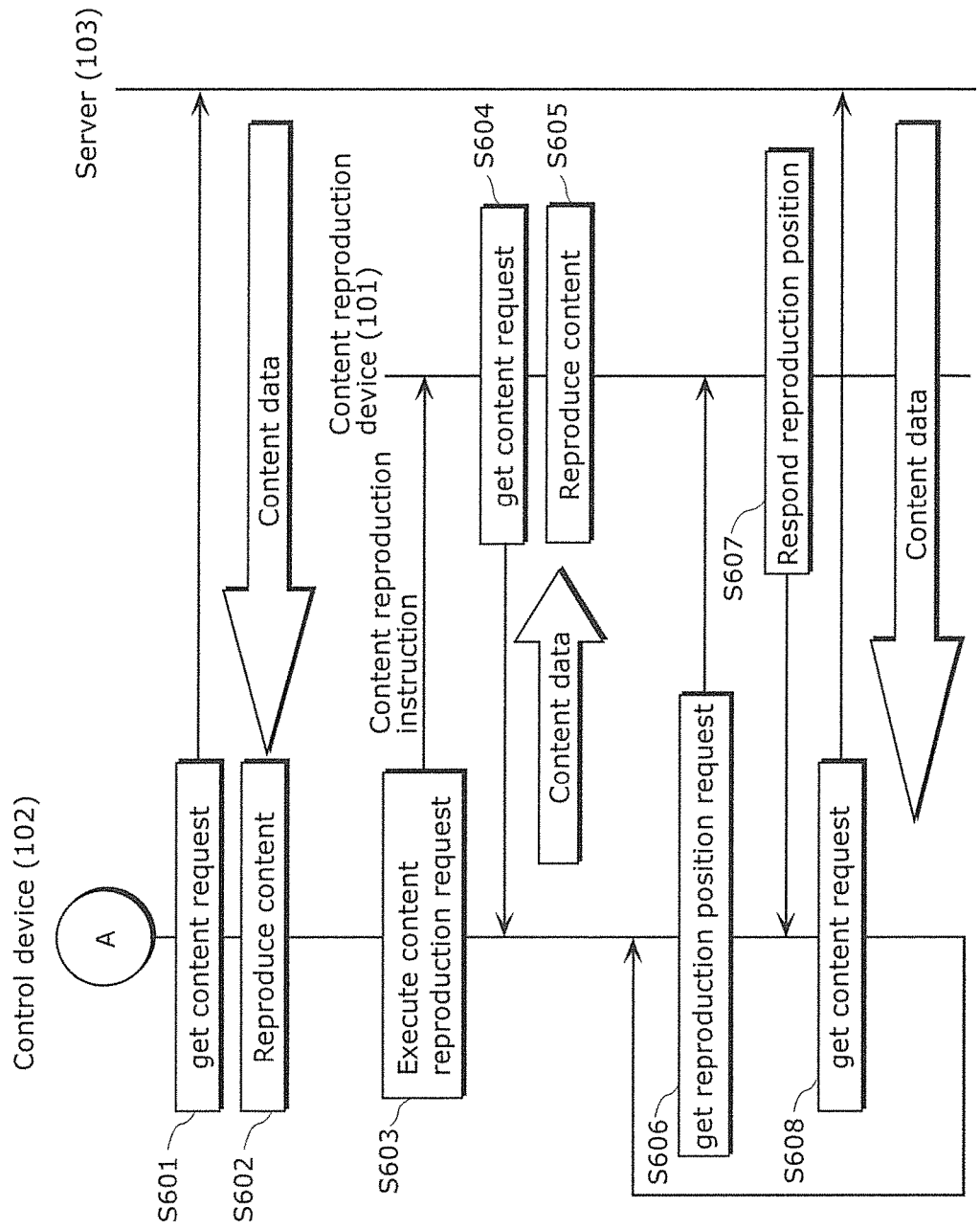
FIG. 6 is a flowchart illustrating processing of the control device where content is reproduced by both a content reproduction device and a control device according to an embodiment 2.

While a part of description is omitted in FIG. 6, the control device 102 in the normal-reproduction mode adjusts a timing at which display of the content (video) starts, based on the response from the content reproduction device 101. On the other hand, the control device 102 in the trick-reproduction mode may adjust a timing at which the acquired content (video) is displayed or acquire, from the server 103, data of the content corresponding to the reproduction position responded from the content reproduction device 101 (step S608) and reproduce the acquired content. Processing herein is similar to that illustrated in FIG. 5 with reference to the embodiment 1 of the present invention. Thus, detailed description is omitted.

As described above, according to the control device, the control system, and the control method of the embodiment 2, if the reproduction mode is the normal reproduction that imposes load on the server 103 and requires reproduction of the content in a high-resolution manner, the content is reproduced by at least the content reproduction device 101 which can reproduce the content on a large screen or in a high-resolution manner, and if the reproduction mode is the trick reproduction such as fast-forwarding or rewinding that imposes load lightly on the server 103 and does not much require reproduction of the content on a large screen of in a high-resolution manner, the content is reproduced by at least the control device 102. Furthermore, the content can be reproduced by both the content reproduction device 101 and the control device 102 in the normal-reproduction mode or the trick-reproduction mode, or both, without limitations in the server 103 such as its performance or the number of simultaneous accesses.

The control device 102 may switch between use of the method according to the embodiment 1 of the present invention, use of the method according to the embodiment 2 of the present invention, and no use of the both methods by allowing a user to make setting through the input unit 1024.

While description has been given with respect to fast-forwarding or rewinding as a reproduction method other than the normal-reproduction mode, with reference to the embodiments 1 and 2 according to the present invention, the trick-reproduction mode may include a seek reproduction (the seek operation) in which a user operates a seek bar displayed on the display unit 1023 of the control device 102 and starts content reproduction from the designated position, or skip reproduction for transitioning to reproduction of content after a period of time such as 30 seconds.

In such a case, a user viewing content on the content reproduction device 101, in many cases, switches the reproduction mode to the normal-reproduction mode after repeating the seek reproduction or skip reproduction operation one or more times, for example. Hence, the control device 102 can also display, on the display unit 1023, content (video) at a reproduction position sought before the normal-reproduction mode starts, or content (video) reproduced after skip.

As described above, by displaying content. which is displayed at seek reproduction or skip reproduction, on the display unit 1023 (a display) of the control device 102, a user can readily switch the reproduction mode to the normal-reproduction mode at a desired timing on only the control device 102, without changing viewpoint between the content reproduction device 101 and the control device 102.

A part or the whole of the communication unit 1021, the content reproduction device determination unit 1022, the video synchronization control unit 1025, and the simultaneous content reproduction ability determination unit 1026 included in the control device 102 of FIG. 2 can be implemented in dedicated hardware (dedicated circuit) which processes the various telegrams and information described above. As alternative, typically, the communication unit 1021, the content reproduction device determination unit 1022, the video synchronization control unit 1025, and the simultaneous content reproduction ability determination unit 1026 can be implemented in software. In other words, the operation described above may be written to software stored in a ROM, and the software may be executed in a common MPU or memory. While the ROM is preferably a nonvolatile recording medium such as a rewritable ROM, the ROM can also be implemented in a volatile recording medium.

It should be noted that the control device, the control system, and the control method according to the present invention have an object to further improve the content reproduction scheme conforming to the DLNA. Thus, communication is established between the server 103 and the content reproduction device 101, using a communication protocol conforming to the digital living network alliance (DLNA) standard, and the notations of respective information and telegrams have been described by way of example, in forms conforming to the DLNA. The present invention, however, is also applicable to control devices and control systems that do not conform to the DLNA.

Moreover, the present invention is not limited to the above embodiments, and it is to be understood that various modifications are possible to the configuration of the embodiments, content and the form of the telegram, and flowchart sequence, are intended to be included within the scope of the present invention.

INDUSTRIAL APPLICABILITY

The control device, the control system, and the control method according to the present invention are applicable as systems and methods which instruct the content reproduction device on a network to reproduce content and cause the content reproduction device to reproduce the content.

REFERENCE SIGNS LIST

101 Content reproduction device
102 Control device
103 Server
104 LAN
1011, 1021 Communication unit
1012, 1023 Display unit
1022 Content reproduction device determination unit
1024 Input unit
1025 Video synchronization control unit
1026 Simultaneous content reproduction ability determination unit

The invention claimed is:

1. A control device for controlling reproduction of content stored in a server, the control device comprising:
a communication unit configured to communicate with the server and a content reproduction device;
an input unit configured to accept input of a reproduction mode specifying at least one of a reproduction speed, a reproduction direction, and a reproduction position of the content;
a content reproduction device determination unit configured to determine, in accordance with the reproduction mode accepted by the input unit, whether the content is to be reproduced by the content reproduction device or by the control device; and
a display unit configured to display the content reproduced by the control device,
wherein if the content reproduction device determination unit determines that the content is to be reproduced by the content reproduction device, the content reproduction device determination unit is configured to transmit a content reproduction instruction to the content reproduction device through the communication unit, the content reproduction instruction instructing the content reproduction device to reproduce the content in the reproduction mode accepted by the input unit, and
if the content reproduction device determination unit determines that the content is to be reproduced by the control device, the content reproduction device determination unit is configured to acquire the content from the server through the communication unit and cause the display unit to display the content reproduced in the reproduction mode accepted by the input unit,
wherein if the reproduction mode is a normal-reproduction mode in which the content is reproduced forward at a predetermined reproduction speed, the content reproduction device determination unit is configured to determine that the content is to be reproduced by only the content reproduction device, and if the reproduction mode is a trick-reproduction mode different from the normal-reproduction mode, the content reproduction device determination unit is configured to determine that the content is to be reproduced by only the control device.

2. A control device for controlling reproduction of content stored in a server, the control device comprising:

a communication unit configured to communicate with the server and a content reproduction device;

an input unit configured to accept input of a reproduction mode specifying at least one of a reproduction speed, a reproduction direction, and a reproduction position of the content;

a content reproduction device determination unit configured to determine, in accordance with the reproduction mode accepted by the input unit, whether the content is to be reproduced by the content reproduction device or by the control device; and a display unit configured to display the content reproduced by the control device, wherein if the content reproduction device determination unit determines that the content is to be reproduced by the content reproduction device, the content reproduction device determination unit is configured to transmit a content reproduction instruction to the content reproduction device through the communication unit, the content reproduction instruction instructing the content reproduction device to reproduce the content in the reproduction mode accepted by the input unit, and if the content reproduction device determination unit determines that the content is to be reproduced by the control device, the content reproduction device determination unit is configured to acquire the content from the server through the communication unit and cause the display unit to display the content reproduced in the reproduction mode accepted by the input unit, wherein if the reproduction mode is a normal-reproduction mode in which the content is reproduced forward at a predetermined reproduction speed, the content reproduction device determination unit is configured to determine that the content is to be reproduced by only the content reproduction device, and if the reproduction mode is a trick-reproduction mode different from the normal-reproduction mode, the content reproduction device determination unit is configured to determine that the content is to be reproduced by both the content reproduction device and the control device.

3. A control device for controlling reproduction of content stored in a server, the control device comprising:

a communication unit configured to communicate with the server and a content reproduction device;

an input unit configured to accept input of a reproduction mode specifying at least one of a reproduction speed, a reproduction direction, and a reproduction position of the content;

a content reproduction device determination unit configured to determine, in accordance with the reproduction mode accepted by the input unit, whether the content is to be reproduced by the content reproduction device or by the control device; and a display unit configured to display the content reproduced by the control device, wherein if the content reproduction device determination unit determines that the content is to be reproduced by the content reproduction device, the content reproduction device determination unit is configured to transmit a content reproduction instruction to the content reproduction device through the communication unit, the content reproduction instruction instructing the content reproduction device to reproduce the content in the reproduction mode accepted by the input unit, and if the content reproduction device determination unit determines that the content is to be reproduced by the control device, the content reproduction device determination unit is configured to acquire the content from the server through the communication unit and cause the display unit to display the content reproduced in the reproduction mode accepted by the input unit, wherein if the reproduction mode is a normal-reproduction mode in which the content is reproduced forward at a predetermined reproduction speed, the content reproduction device determination unit is configured to determine that the content is to be reproduced by both the content reproduction device and the control device, and if the reproduction mode is a trick-reproduction mode different from the normal-reproduction mode, the content reproduction device determination unit is configured to determine that the content is to be reproduced by only the control device.

4. The control device according to claim 2, further comprising a video synchronization control unit configured to synchronize reproduction of the content by the control device with reproduction of the content by the content reproduction device when the content is reproduced by both the content reproduction device and the control device.

5. The control device according to claim 4, wherein the video synchronization control unit is configured to acquire a reproduction position of the content being reproduced by the content reproduction device, from the content reproduction device through the communication unit, and adjust an acquisition position of the content which is reproduced by the control device, or a timing at which the content is displayed on the display unit, in accordance with the reproduction position acquired through the communication unit.

6. The control device according to claim 2, further comprising a simultaneous content reproduction ability determination unit configured to determine whether the server is capable of simultaneously sending out a plurality of items of the content, wherein if the simultaneous content reproduction ability determination unit determines that the server is capable of simultaneously sending out the plurality of items of content, the content reproduction device determination unit is further configured to determine that the content is to be reproduced by both the content reproduction device and the control device.

7. The control device according to claim 2, further comprising a simultaneous content reproduction ability determination unit configured to determine whether the control device is capable of receiving a plurality of items of the content at a bitrate necessary for reproducing the plurality of items of content in the reproduction mode accepted by the input unit, wherein if the simultaneous content reproduction ability determination unit determines that the control device is capable of receiving the plurality of items of content at the bitrate necessary for reproducing the plurality of items of content in the reproduction mode accepted by the input unit, the content reproduction device determination unit is further configured to determine that the content is to be reproduced by both the content reproduction device and the control device.

8. The control device according to claim 2, wherein if the content reproduction device determination unit determines that the content is to be reproduced by both the content reproduction device and the control device, the content reproduction device determination unit is further configured to transmit the content acquired from the server through the communication unit to the content reproduction device through the communication unit.

9. A control device for controlling reproduction of content stored in a server, the control device comprising:
  a communication unit configured to communicate with the server and a content reproduction device;
  an input unit configured to accept input of a reproduction mode specifying at least one of a reproduction speed, a reproduction direction, and a reproduction position of the content;
  a content reproduction device determination unit configured to determine, in accordance with the reproduction mode accepted by the input unit, whether the content is to be reproduced by the content reproduction device or by the control device; and
  a display unit configured to display the content reproduced by the control device,
  wherein if the content reproduction device determination unit determines that the content is to be reproduced by the content reproduction device, the content reproduction device determination unit is configured to transmit a content reproduction instruction to the content reproduction device through the communication unit, the content reproduction instruction instructing the content reproduction device to reproduce the content in the reproduction mode accepted by the input unit, and
  if the content reproduction device determination unit determines that the content is to be reproduced by the control device, the content reproduction device determination unit is configured to acquire the content from the server through the communication unit and cause the display unit to display the content reproduced in the reproduction mode accepted by the input unit,
  wherein if the reproduction mode is a normal-reproduction mode in which the content is reproduced forward at a predetermined reproduction speed, the content reproduction device determination unit is configured to determine that the content is to be reproduced by only the content reproduction device, and
  if the reproduction mode is seek operation in which a reproduction position of the content is designated, the content reproduction device determination unit is configured to determine that the content is to be reproduced by at least the control device.

10. A control device for controlling reproduction of content stored in a server, the control device comprising:
  a communication unit configured to communicate with the server and a content reproduction device;
  an input unit configured to accept input of a reproduction mode specifying at least one of a reproduction speed, a reproduction direction, and a reproduction position of the content;
  a content reproduction device determination unit configured to determine, in accordance with the reproduction mode accepted by the input unit, whether the content is to be reproduced by the content reproduction device or by the control device; and
  a display unit configured to display the content reproduced by the control device,
  wherein if the content reproduction device determination unit determines that the content is to be reproduced by the content reproduction device, the content reproduction device determination unit is configured to transmit a content reproduction instruction to the content reproduction device through the communication unit, the content reproduction instruction instructing the content reproduction device to reproduce the content in the reproduction mode accepted by the input unit, and
  if the content reproduction device determination unit determines that the content is to be reproduced by the control device, the content reproduction device determination unit is configured to acquire the content from the server through the communication unit and cause the display unit to display the content reproduced in the reproduction mode accepted by the input unit,
  wherein the input unit is further configured to accept input of correspondence between the reproduction mode and whether the content is to be reproduced by the content reproduction device or by the control device when the reproduction mode is selected, and
  the content reproduction device determination unit is configured to determine whether the content is to be reproduced by the content reproduction device or by the control device, in accordance with the correspondence accepted by the input unit.

\* \* \* \* \*